United States Patent
Ou et al.

(10) Patent No.: US 9,908,295 B2
(45) Date of Patent: Mar. 6, 2018

(54) 3D PRINTED AUXETIC STRUCTURES

(71) Applicant: Autodesk, Inc., San Rafael, CA (US)

(72) Inventors: Jifei Ou, Cambridge, MA (US); Karl Willis, Millbrae, CA (US)

(73) Assignee: Autodesk, Inc., San Rafael, CA (US)

( * ) Notice: Subject to any disclaimer, the term of this patent is extended or adjusted under 35 U.S.C. 154(b) by 407 days.

(21) Appl. No.: 14/699,916

(22) Filed: Apr. 29, 2015

(65) Prior Publication Data

US 2016/0318255 A1     Nov. 3, 2016

(51) Int. Cl.
| | |
|---|---|
| *G06F 19/00* | (2011.01) |
| *B29C 67/00* | (2017.01) |
| *G05B 19/4099* | (2006.01) |
| *B33Y 50/02* | (2015.01) |

(52) U.S. Cl.
CPC ...... *B29C 67/0088* (2013.01); *G05B 19/4099* (2013.01); *B33Y 50/02* (2014.12); *G05B 2219/35134* (2013.01); *G05B 2219/49007* (2013.01); *Y02P 90/265* (2015.11)

(58) Field of Classification Search
CPC .. B32B 3/12; F16F 3/093; F16F 7/121; Y10T 428/249921; B29C 67/0088; B33Y 50/02; G05B 19/4099; G05B 2219/35134; G05B 2219/49007; Y02P 90/265
See application file for complete search history.

(56) References Cited

U.S. PATENT DOCUMENTS

| | | | |
|---|---|---|---|
| 6,219,055 B1 * | 4/2001 | Bhargava | G06T 17/10 345/420 |
| 7,160,621 B2 | 1/2007 | Chaudhari et al. | |
| 7,252,870 B2 | 8/2007 | Anderson et al. | |
| 7,910,193 B2 | 3/2011 | Ma | |
| 8,034,103 B2 | 10/2011 | Burriesci et al. | |
| 8,772,187 B2 * | 7/2014 | Ugbolue | D04B 21/12 442/1 |

(Continued)

OTHER PUBLICATIONS

"An introduction to auxetic materials: an interview with Professor Andrew Alderson," [online] [Retrieved on Jan. 9, 2015]; Retrieved from the Internet URL: http://www.azom.com/article.aspx?ArticleID=11450, 7 pages.

(Continued)

*Primary Examiner* — Thomas Lee
*Assistant Examiner* — Zhipeng Wang
(74) *Attorney, Agent, or Firm* — Fish & Richardson P.C.

(57) ABSTRACT

Methods, systems, and apparatus, including medium-encoded computer program products, facilitate the design and use of 3D printed auxetic structures. In one aspect, a system includes one or more computer storage media having instructions stored thereon; and one or more data processing apparatus configured to execute the instructions to perform operations including (i) receiving an input specifying a three dimensional (3D) model of a 3D structure that includes at least two different materials having a predefined arrangement with respect to each other to give the 3D structure a negative Poisson ratio, (ii) receiving an input regarding a change for the 3D structure, and (iii) modifying the predefined arrangement of the at least two different materials with respect to each other in response to the input regarding the change.

14 Claims, 10 Drawing Sheets

(56) References Cited

U.S. PATENT DOCUMENTS

| | | | | |
|---|---|---|---|---|
| 2011/0059291 | A1* | 3/2011 | Boyce | C08J 5/00 428/136 |
| 2011/0168313 | A1* | 7/2011 | Ma | B60C 7/14 152/302 |
| 2012/0315456 | A1* | 12/2012 | Scarpa | F16F 3/093 428/221 |
| 2014/0037873 | A1* | 2/2014 | Cheung | B32B 3/06 428/34.1 |
| 2016/0086258 | A1* | 3/2016 | Romes | B29C 67/0088 705/27.1 |
| 2016/0096318 | A1* | 4/2016 | Bickel | B29C 67/0051 264/40.1 |
| 2016/0167306 | A1* | 6/2016 | Vidimce | B29C 67/0088 264/40.1 |

OTHER PUBLICATIONS

"Auxetic materials," [online] [Retrieved on Jan. 9, 2015]; Retrieved from the Internet URL: http://smartstructures.wikispaces.com/Auxetic+materials/, 9 pages.

Chen and Lakes, "Micromechanical analysis of dynamic behavior of conventional and negative Poisson's ratio foams," J. of Eng. Mater. and Technol., ASME, 118:285-288, 1996.

Choi and Lakes, "Non-linear properties of metallic cellular materials with a negative Poisson's ratio," J. of Mater. Sci., 27(19):5373-5381, 1992.

Choi and Lakes, "Fracture toughness of re-entrant foam materials with a negative Poisson's ratio: experiment and Analysis," Int. J. of Fracture, 80:73-83, 1996.

Critchley, et al., "The preparation of auxetic foams by three-dimensional printing and their characteristics," Adv. Eng. Mater., 15(10):980-985. 2013.

Evans, "Auxetic polymers: a new range of materials," Endeavour, 15(4):170-174, 1991.

Lakes and Elms, "Indentability of conventional and negative Poisson's ratio foams," J. of Comp. Mat., 27(12):1193-1202, 1993.

Shen, et al., "Simple cubic three-dimensional auxetic metamaterials," Phys. Status Solidi B, 251(8):1515-1522, 2014.

Tilley, "Autodesk wants to show the world how to make things—to sell more software," [online] [Retrieved on Mar. 2, 2015]; Retrieved from the Internet URL: http://www.forbes.com/sites/aarontilley/2014/09/10/autodesk-makes-hardware-too/, 4 pages.

Skylar Tibbits, "The Emergence of '4D Printing'—TED Talk Subtitles and Transcript—TED.com," (Feb. 2013) [online] (retrieved from https://www.ted.com/talks/skylar_tibbits_the_emergence_of_4d_printing/transcript?language=en), 5 pages.

* cited by examiner

3D PRINTED AUXETIC STRUCTURES

BACKGROUND

This specification relates to three dimensional (3D) structures and 3D modeling programs, such as computer-aided design (CAD) applications used with 3D printing.

CAD software has been developed and used to generate two dimensional (2D) and 3D representations of objects. Such 3D representations of objects have employed various modeling techniques to represent the 3D object. In general, 3D models can be divided into two categories: (1) solid models that represent volumes of the object, and (2) shell models that represent the boundaries between solid and non-solid parts of the 3D object. In addition, such 3D models have been used in traditional subtractive manufacturing as well as more recent additive manufacturing, such as 3D printing using different types of materials.

Figure 1:
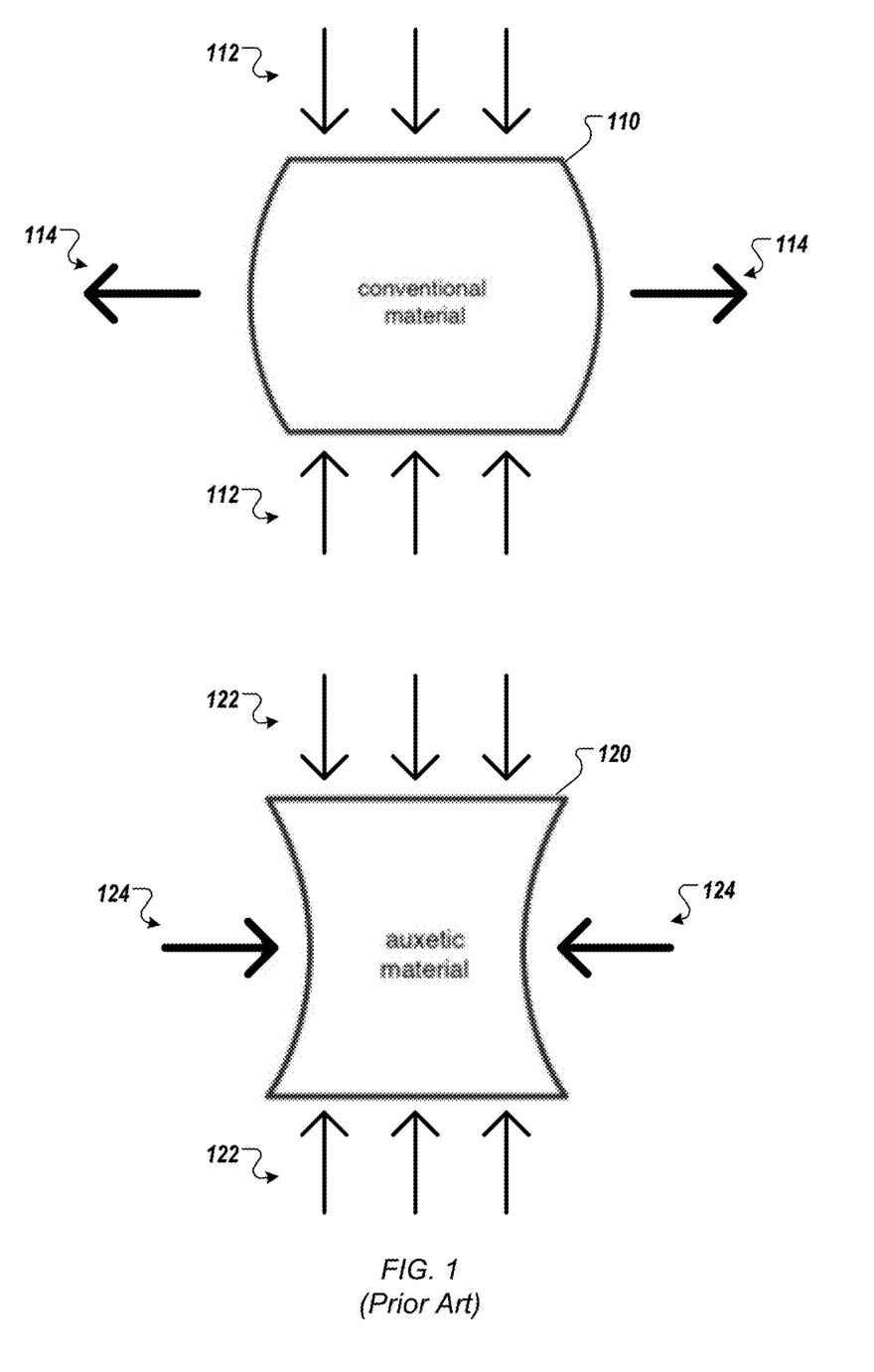
FIG. 1 shows a comparison of a conventional material with an auxetic material.

Further, a particular type of material is an auxetic material, which is a material that has a negative Poisson ratio. FIG. 1 shows a comparison of a conventional material 110 with an auxetic material 120. Unlike conventional materials, when an auxetic material is stretched (or compressed) in one direction, instead of becoming thinner (or thicker), it becomes thicker (or thinner) in perpendicular directions. Thus, as shown in FIG. 1, when a compressive load 112 is placed on the conventional material 110, the material 110 expands 114. In contrast, when a compressive load 122 is placed on the auxetic material 120, the material 120 shrinks 124.

Typical auxetic structures are designed with a single polymer. Their fabrication process typically allows only one repetitive cellular unit configuration. In addition, beyond the negative Poisson ratio, auxetic material has been demonstrated to have enhanced mechanical properties, such as shear resistance, indentation resistance, and fracture toughness. It has also demonstrated an enhanced sound and vibration absorption property.

SUMMARY

This specification describes technologies relating to the design and use of 3D printed auxetic structures. In general, one or more aspects of the subject matter described in this specification can be embodied in one or more methods that include receiving an input specifying a three dimensional (3D) model of a 3D structure that includes at least two different materials having a predefined arrangement with respect to each other to give the 3D structure a negative Poisson ratio; receiving an input regarding a change for the 3D structure; and modifying the predefined arrangement of the at least two different materials with respect to each other in response to the input regarding the change.

Modifying the predefined arrangement can include reconfiguring a ratio and deposit location of at least one of the at least two different materials to change a global stiffness and a maximum reduce area of the 3D structure. Receiving the input regarding the change for the 3D structure can include receiving at least one target property for the 3D structure, and modifying the predefined arrangement can include: generating multiple modified versions of the 3D model of the 3D structure; simulating structural aspects of the multiple modified versions of the 3D model of the 3D structure; and selecting one of the multiple modified versions of the 3D model of the 3D structure as having a best set of the simulated structural aspects for the at least one target property for the 3D structure.

Receiving the input regarding the change for the 3D structure can include receiving numerical input through a user interface that specifies values for predefined parameters affecting both a ratio between at least two of the at least two different materials and a deposit location of at least one of the at least two different materials, and modifying the predefined arrangement can include: updating the 3D model using the values for the predefined parameters to change at least the ratio and the deposit location in the 3D model; and displaying at least a simplified representation of the 3D model to show the change in at least the ratio and the deposit location. The user interface can include multiple user interface elements corresponding to the predefined parameters can include a cellular unit size, a position of a first of the at least two different materials, an amount of the first of the at least two different materials, and a transition rate between the first of the at least two different materials and a second of the at least two different materials.

The 3D structure can include a repeated pattern of struts forming elements of a lattice, a strut in the repeated pattern can include (i) a first material forming at least a first part of the strut and (ii) a second different material forming at least a second part of the strut, and the method can include adjusting in the 3D model of the lattice a gradation of change in material distribution between the first material and the second material in the strut based on input. In addition, the 3D structure can include at least two different structural configurations that deform differently in response to a load, and the method can include embedding human or computer readable information in a pattern of deformation of a first of the at least two different structural configurations, a second of the at least two different structural configurations, or both the first structural configuration and the second structural configuration in the 3D structure.

According to another aspect, a 3D printed auxetic structure includes: a repeated pattern of struts forming elements of a lattice; wherein each of the struts in the repeated pattern includes (i) a first material forming at least a first part of the strut, and (ii) a second material, which is different than the first material, forming at least a second part of the strut; and wherein a ratio of the first material to the second material and at least one deposit location of the first material in the 3D printed auxetic structure have been adjusted to make the 3D printed auxetic structure satisfy a global stiffness and a maximum reduce area of the 3D printed auxetic structure.

The first material can be a soft polymer, and the second material can be a hard polymer. The repeated pattern of struts can be a first repeated pattern of struts, the structure can include a second repeated pattern of struts forming additional elements of the lattice, and the first repeated pattern of struts and the second repeated pattern of struts can have different cellular unit configurations. Further, the first repeated pattern of struts can deform differently than the second repeated pattern of struts when the 3D printed auxetic structure is deformed by a load, and human or computer readable information can be embedded in a pattern of deformation of the first repeated pattern of struts, the second repeated pattern of struts, or both the first repeated pattern and the second repeated pattern in the 3D printed auxetic structure.

According to another aspect, a system includes one or more computer storage media having instructions stored thereon; and one or more data processing apparatus configured to execute the instructions to perform operations including (i) receiving an input specifying a 3D model of a 3D structure that includes at least two different materials having a predefined arrangement with respect to each other to give the 3D structure a negative Poisson ratio, (ii) receiving an input regarding a change for the 3D structure, and (iii) modifying the predefined arrangement of the at least two different materials with respect to each other in response to the input regarding the change.

The predefined arrangement can include reconfiguring a ratio and deposit location of at least one of the at least two different materials to change a global stiffness and a maximum reduce area of the 3D structure. The at least two different materials can include a soft polymer and a hard polymer. The 3D structure can include at least two cellular unit configurations. Moreover, the operations performed by the system can include additional aspects of the method, such as described above.

Particular embodiments of the subject matter described in this specification can be implemented to realize one or more of the following advantages. Auxetic structures can be designed in which one or more properties (e.g., global stiffness and maximum reduce area) of the structure are highly tunable. By providing a system with which the properties of a 3D printed auxetic structure can be readily adjusted and refined at design time, before 3D printing, the workflow for creating various types of products can be enhanced. For example, properties of auxetic structures (e.g., shear resistance, indentation resistance, fracture toughness, and sound & vibration absorption) can be accurately adjusted to meet design requirements for products that use negative Poisson ratio structures (e.g., fasteners, artificial blood vessels, smart valves and filters, tunable phononic and photonic materials, etc.), products with enhanced toughness, resilience and shear resistance (e.g., prosthetic material, crash helmets, body armor, road bumper, etc.), products for sound and vibration absorption (e.g., architecture materials, car seats, etc.), and products using porous structures (e.g., surgical implants). A 3D printed auxetic structure, designed using the systems and techniques described herein, can provide a high level of customization of material and a faster fabrication process. With the described 3D printing method, the abovementioned properties can be highly tunable to better fit into their applications. Moreover, the overall volume and size can be designed to fit exactly with different requirements, e.g., one can design a helmet with an auxetic structure that fits exactly to a specific person's head.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 2:
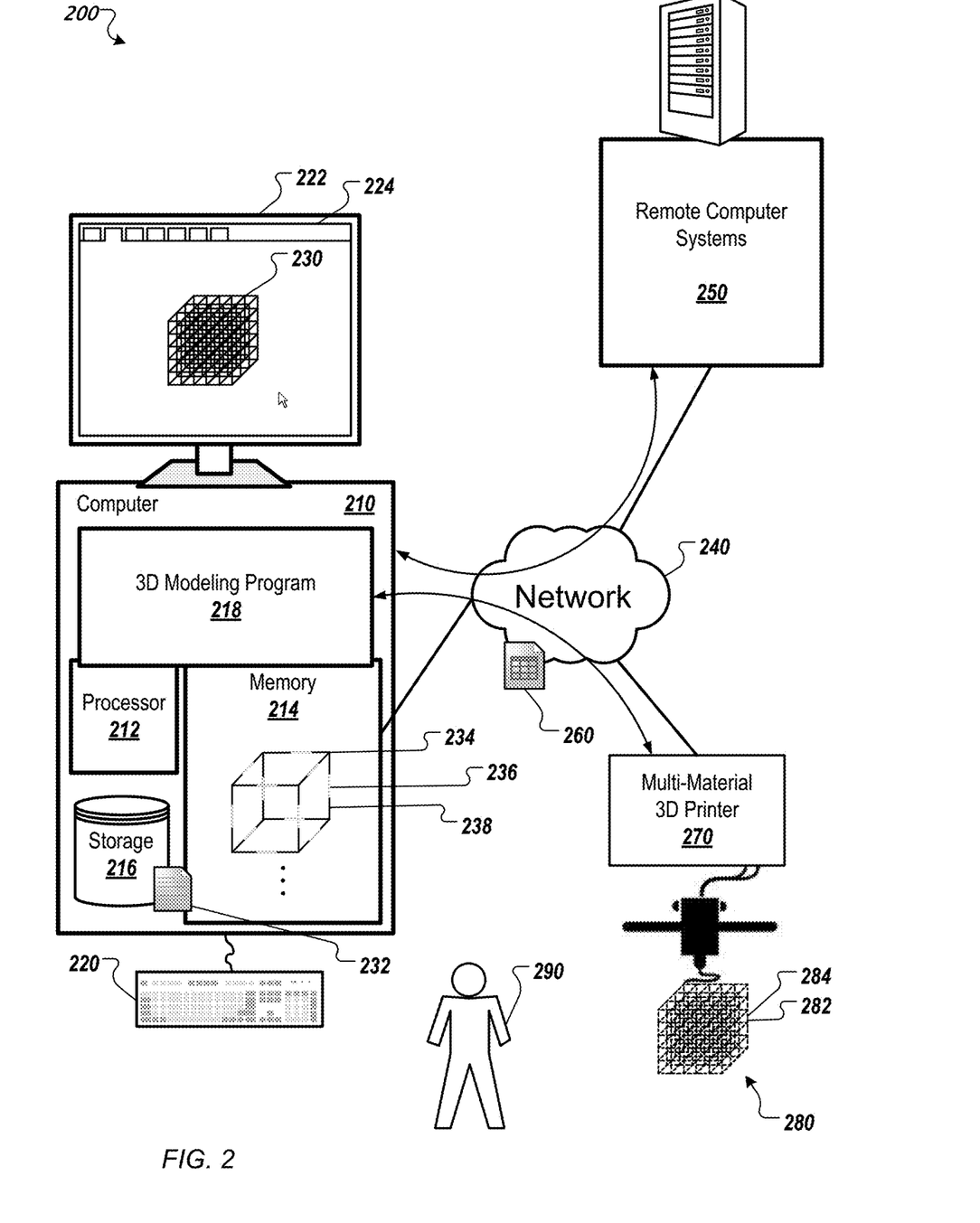
FIG. 2 shows an example of a system that facilitates the design and additive manufacture of three dimensional (3D) auxetic structures.

FIG. 2 shows an example of a system 200 that facilitates the design and additive manufacture of three dimensional (3D) auxetic structures. A computer 210 includes a processor 212 and a memory 214, and the computer 210 can be connected to a network 240, which can be a private network, a public network, a virtual private network, etc. The processor 212 can be one or more hardware processors, which can each include multiple processor cores. The memory 214 can include volatile and/or non-volatile memory, such as Random Access Memory (RAM) and Flash RAM. The computer 210 can include various types of computer storage media and devices, which can include the memory 214 and a persistent storage device 216 (e.g., a hard disk drive), to store instructions of programs that run on the processor 212 as well as data therefor.

Such programs can include a 3D modeling program 218, which can run locally on computer 210 or remotely on a computer of one or more remote computer systems 250 (e.g., in a server system accessible by the computer 210 via the network 240). The 3D modeling program 218 presents a user interface (UI) 224 on a display device 222 of the computer 210, which can be operated using one or more input devices 220 of the computer 210 (e.g., keyboard and mouse). Note that while shown as separate devices in FIG. 2, the display device 222 and/or input devices 220 can also be integrated with each other and/or with the computer 210, such as in a tablet computer.

A user 290 can interact with the 3D modeling program 218 to create a 3D model 230 of an object 280 to be printed using a multi-material 3D printer 270, which can be connected to the computer 210 through the network 240 (as shown) or directly connected to the computer 210. This can be done using known graphical user interface tools, and the display 222 can present a view of the 3D object being modeled in three dimensions as a projection into the two dimensional space of the display device 222 (as shown). In addition, the UI 224 of the program 218 can allow the user 290 to provide input specifying amounts and locations of at least two different materials in the structure 280 printed from the model 230. Although shown here as a simple box-shaped lattice structure, it will be appreciated that many different types of 3D auxetic structures can be designed and printed using the system 200.

The 3D modelling program 218 can generate the 3D model 230 (or at least part of a 3D model 230) from one or more reconfigurable cellular units 234. Each cellular unit 234 is a base shape that can be copied (either identically or with mirroring) to form a repeating pattern of a structure. In the example shown, the base shape is a cube, but note that variations in the base shape are possible, such as an irregular cube. The system 200 can provide one or more predefined cellular units 234, which can be selected (by user or by program) for use, and/or the system 200 can provide an application program interface (API) that allows a user or program to define one or more cellular units 234. In addition, a 3D model of a 3D structure can be built from different ones of these cellular units 234 and/or from different configurations of each such cellular unit 234.

A cellular unit 234 can be a computer-stored definition of a repeatable pattern of struts between junctions forming a 3D lattice structure, where one or more of the struts in the cellular unit 234 are composed of two different materials that can be reconfigured to modify the design of the 3D structure. For example, a strut can have a main portion 238 that is 3D printed using a hard polymer 282 and an additional portion 236 that is 3D printed using a soft polymer 284. Hard materials can be those with tensile strength around 50-65 megapascals (MPa), and soft materials can be those with tensile strength around 0.8-1.5 MPa. An example of a hard material is VeroWhite, and an example of a soft material is TangoBlackPlus FLX 980, both of which are available from Stratasys Inc. of Eden Prairie Minn.

Using these different materials within the lattice can create a 3D printed auxetic structure. A ratio of the amount of the additional portion 236 as compared to the main portion 238 can be adjusted, and/or a position (which corresponds to deposit location during 3D printing) of the additional portion 236 can be adjusted. Such reconfiguration of the ratio and the deposit location of one of the two materials in the 3D model (e.g., the soft polymer) can allow the system 200 to finely tune the global stiffness and the maximum reduce area of the structure 280 that is 3D printed. In addition, as noted above, two or more cellular unit configurations can be integrated in one structure. Further, the reconfigurations can be fully numerically controllable in the system 200.

When the cellular unit(s) 234 have been reconfigured as desired, the reconfiguration information can be stored for later retrieval and use. The reconfiguration information can be stored in a document (or documents) 232 along with data for the 3D model 230 that is generated or modified by the reconfiguration information, or the reconfiguration information can be stored in an entirely separate document 232. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the stored document 232 can later be reloaded, revised (as needed) and used to prepare the 3D model 230 for 3D printing. In addition, the document 232 can be sent over the network 240, such as to an online marketplace server system 250 for 3D models made available for sale and 3D printing. A multi-material 3D printer 270 (e.g., the Objet Connex 500 3D printer available from Stratasys Inc. of Eden Prairie, Minn.) can print the structure 280 using the different materials 282, 284 at the locations and in the amounts specified by the cellular unit design(s).

Figure 3A:
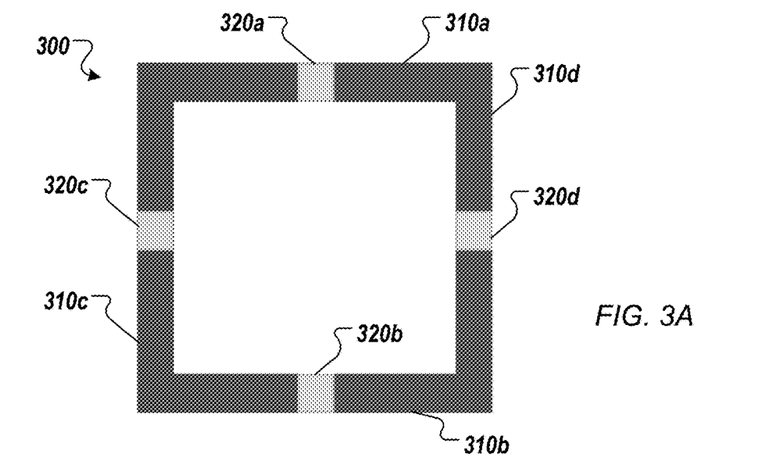
FIGS. 3A-3C show an example of a cellular unit and different structure configurations generated therefrom.

FIG. 3A shows an example of a cellular unit 300. In this example, the cellular unit 300 is a rectangular unit cell of hard material, which has soft material as hinges 320a, 320b, 320c, 320d in respective sides 310a, 310b, 310c, 310d of the unit 300. This example is presented for ease of understanding. But as will be appreciated, different shapes and structures can be used as a cellular unit, including three dimensional structures that form components of lattice(s). In some implementations, a cellular unit can be repeated to form a larger structure by making identical copies of the cellular unit. In some implementations, a cellular unit can be modified when forming a larger structure, such as through mirroring of the cellular unit. For example, the cellular unit 300 can be mirrored along side 310d and then mirrored along side 310b to form a new structure of four squares that can then be copied repeatedly to form a larger structure.

Figure 3B:
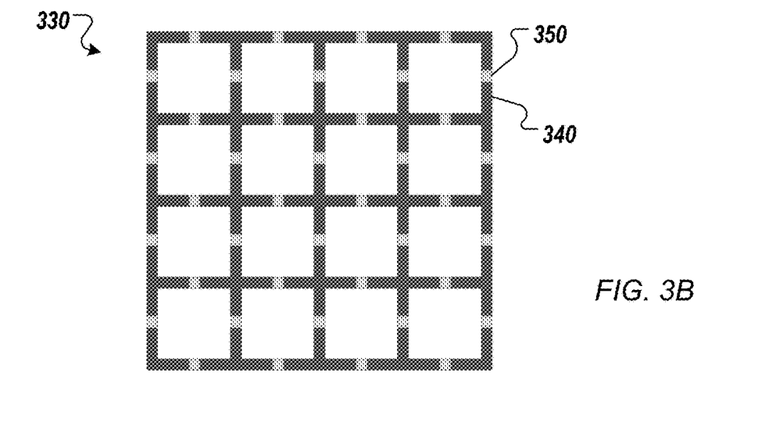

In the example of FIGS. 3A-3B, the cellular unit 300 is mirrored and copied to form a two dimensional (2D) lattice 330 with a particular configuration, which can then be extruded in a third dimension to make a 3D structure. As shown in FIG. 3B, the lattice 330 uses a default configuration of the hinges 320a, 320b, 320c, 320d, where each hinge is placed in the middle of each side. Thus, a hinge 350 (made of a flexible first material) is placed in the middle of a strut 340 (made of a less flexible second material) in the printed 3D structure.

Figure 3C:
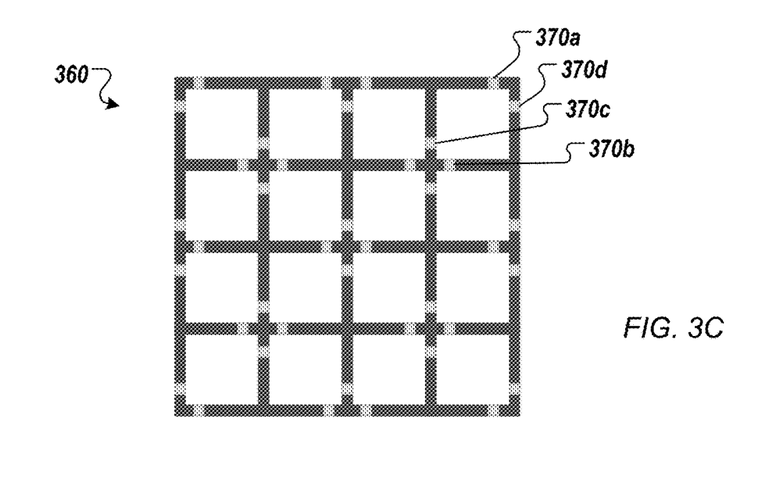

Moving the hinges 320a & 320c towards the upper left vertex of the cellular unit 300, and moving hinges 320b & 320d towards the lower right vertex of the cellular unit 300 creates a new lattice 360 with a new configuration, as shown in FIG. 3C, where hinges 370a, 370b, 370c, 370d are closer to the junctions in the lattice. Such adjustments of the placements of the hinges 320a, 320b, 320c, 320d enables the creation of new auxetic structures that have higher maximum reduce area. Adjusting the locations and sizes of the hinges 370a, 370b, 370c, 370d allows rapid redesign of an auxetic structure to change one or more properties of the auxetic structure to meet a desired goal. For example, the global stiffness of the structure can be increased (or decreased) by adding (or subtracting) the length of each hinge.

Figure 4A:
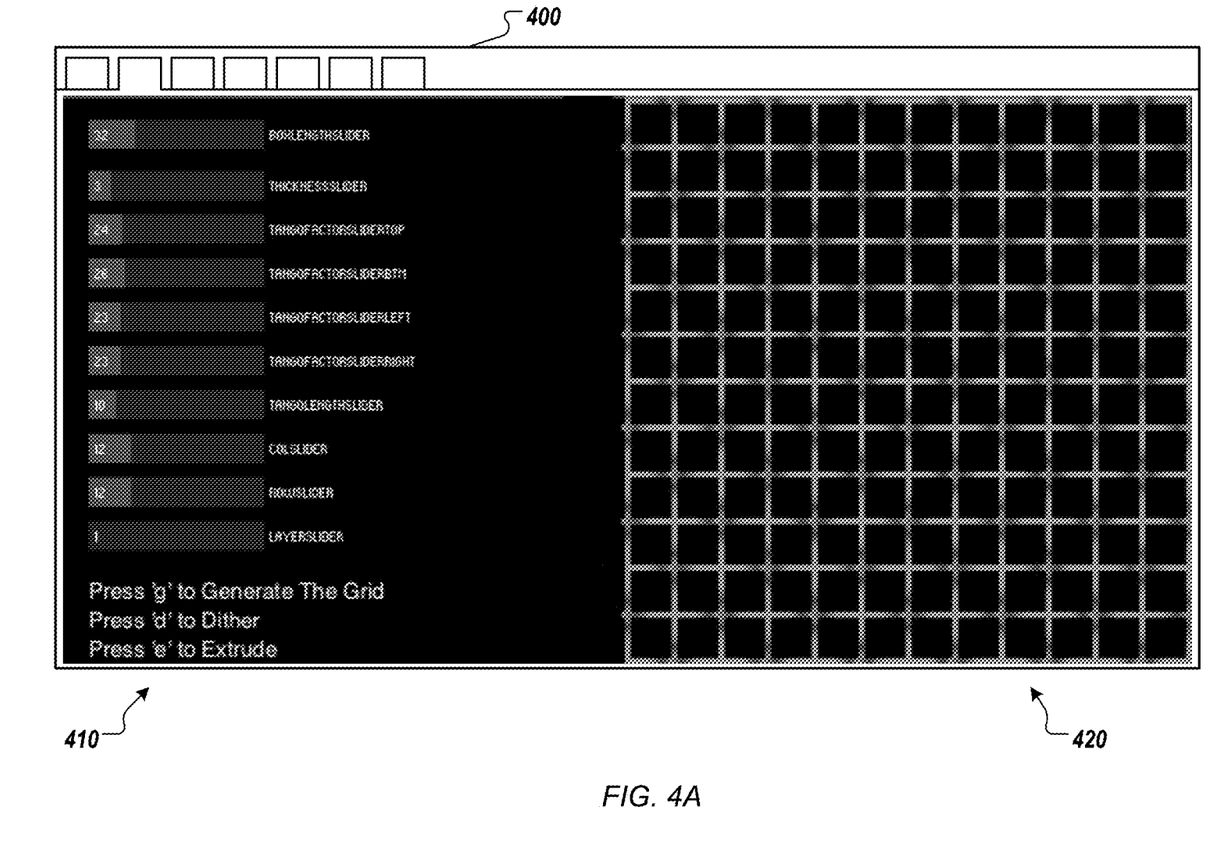
FIG. 4A shows an example of a user interface in a system.

A computer program can provide an interface to control the material distribution pattern, and the computer program can also later generate image data (using the pattern specification) for the 3D printer to print. FIG. 4A shows an example of the UI 224 from FIG. 2, with the 3D model 230 being created, along with UI elements for specifying parameter values to control the amount and distribution of the different materials forming a structure. The UI 400 shown in FIG. 4A can be built into the 3D modelling program 218 from FIG. 2, and it can also utilize an underlying application programming interface (API) that enables both the user and programs to create or import new cellular units and new parameter controls. The user can do this through create/import cell unit(s) and/or parameter control(s) interface element(s), whereas a program can do this directly by calling the methods defined by the API.

The UI 400 includes a screen area 420 in which a simplified representation of the 3D model (or at least the lattice generation portion thereof) is displayed. The UI 400 also includes one or more UI elements, in a screen area 410, providing numerical control over the predefined parameters of the cellular unit and the structure generated therefrom. These predefined parameters can affect both a ratio between at least two different materials and a deposit location of at least one material. In some implementations, the predefined parameters can include a cellular unit size (e.g., a single size value or different sizes in different dimensions), one or more positioning values for one or more components of the cellular unit where a specific one of two or more different materials is to be used (e.g., separate location specifications for separate hinges), and an amount of the specific material to use (e.g., the size of the hinges as compared to the size of the cellular unit).

In the example shown, the UI elements in the screen area 410 are sliders. But various other types of UI elements are also possible. In the example shown, the sliders are labeled BOXLENGTHSLIDER (which indicates the width and height of a single rectangular unit), THICKNESSSLIDER (which indicates the wall thickness of the single rectangular unit), TANGOFACTORSLIDERTOP (which indicates the position of the soft material on the top side of the single rectangular unit), TANGOFACTORSLIDERBTM (which indicates the position of the soft material on the bottom side of the single rectangular unit), TANGOFACTORSLIDER-LEFT (which indicates the position of the soft material on the left side of the single rectangular unit), TONGOFAC-TORSLIDERRIGHT (which indicates the position of the soft material on the right side of the single rectangular unit), TANGOLENGTHSLIDER (which indicates the length of the soft material on all four sides of the single rectangular unit), COLSLIDER (which indicates the number of times to repeat the single rectangular unit in columns), ROW-SLIDER (which indicates the number of times to repeat the single rectangular unit in rows), and LAYERSLIDER (which indicates the printing layers of the whole material). In addition, the screen area 410 includes references to keyboard controls, where particular keys can be pressed to perform specified functions: 'g' to generate the grid, 'd' to dither, and 'e' to extrude. To generate printing bitmaps in the software for the auxetic material, one can press 'g' to generate the grid, which contains the information that is defined by the user adjusting the slider(s), then press 'd' to computationally dither the bitmaps so that soft and hard material are blended together, and then press 'e' to produce the identical bitmaps repetitively for the printer to create a volumetric print. Note that the interaction of the above operations can be substituted for by other interfaces in various implementations, such as graphical buttons, voice control, etc.

In addition to the control inputs noted above, a transition rate between a first material and a second material can also be controlled. For example, the hinges 320a, 320b, 320c, 320d need not transition immediately from the soft hinge material to the hard frame material. In some implementations, the rate of transition between these two materials can be controlled, such that when the structure is 3D printed, there is a region of the strut of the lattice where both of the different materials are used, and the amount of one of those materials versus the other changes continuously (or in discrete steps) as one moves along the strut.

Figure 4B:
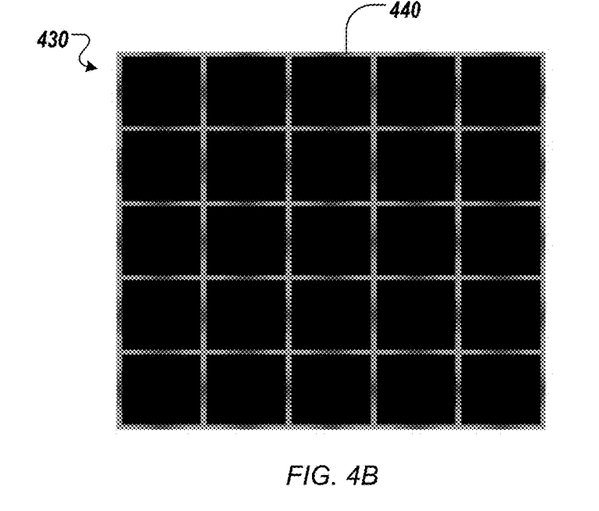
FIG. 4B shows an example of details of distribution of the different materials in a model in the user interface of FIG. 4A.

FIG. 4B shows an example of details of distribution of the different materials, which will be used to form a 3D structure, in the user interface of FIG. 4A. A grid 430 can be presented in the screen area 420 and show an amount of transition region 440 between the two different materials. The size of this transition region (and potentially the gradient of transition therein between the two different materials) can also be controlled by simple numerical inputs. For example, a soft and hard materials transition can be defined by a function having input constants, which can be changed to affect the length over which the transition occurs and also how gradually the material distribution between the soft and hard materials changes along that length. Alternatively, the rate of change between the two materials is a constant that depends on a user specified length of the transition region in the strut.

Thus, a very wide variety of 3D structures, with different structural characteristics, can be readily designed using relatively simple numerical inputs to a reconfigurable structure generating system, as described. The structural reconfiguration can be fully numerically controllable. In addition, simulation testing can be performed on the generated structures, and adjustments to the structure can be readily generated based on an outcome of those simulations, before any product is 3D printed. This can facilitate the tuning of one or more properties of the 3D structure being created, such as the maximum reduce area and material global stiffness of the 3D structure.

Figure 5A:
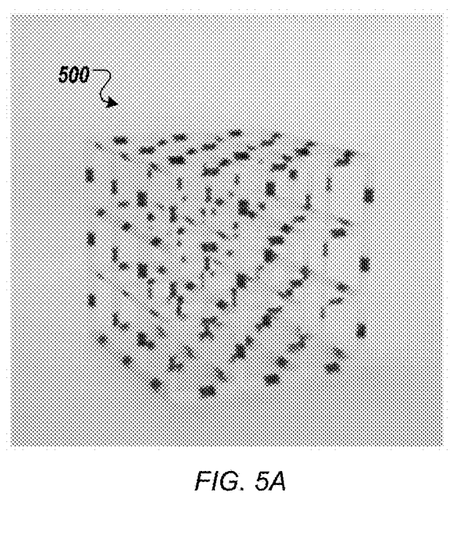
FIGS. 5A-5B show an example of an auxetic structure.
Figure 5B:
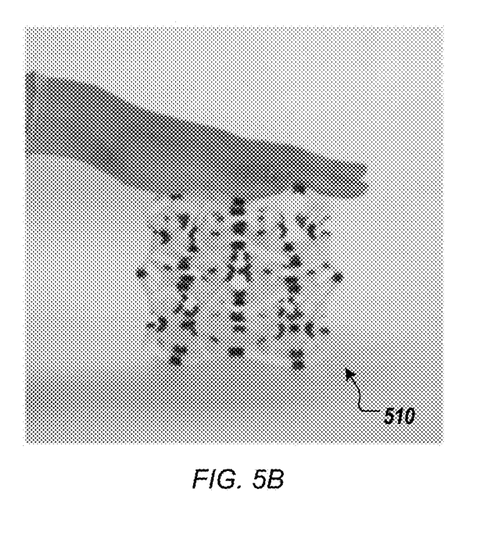

Such 3D printed reconfigurable auxetic structures can provide a consistent negative Poisson ratio, as may be desired in some applications. The material's global stiffness and maximum reduce area can be tuned by programming the soft and hard material distribution, as described above. This allows high flexibility of designing and fabricating auxetic materials upon demand. FIGS. 5A-5B show an example of an auxetic structure in its normal state 500 and in its collapsed state 510 when a force is applied. This example of an auxetic structure is a 3D cube, which can uniformly collapse and recover to its original volume.

Figure 6A:
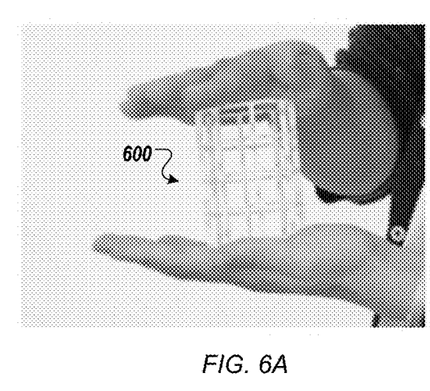
FIGS. 6A-6B show another example of an auxetic structure.
Figure 6B:
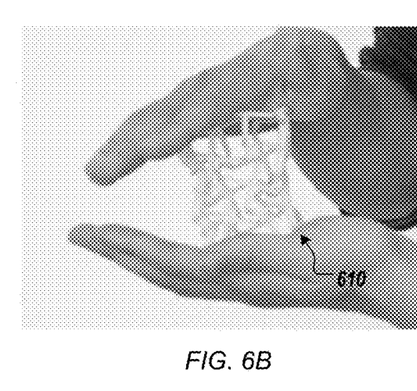

FIGS. 6A-6B show another example of an auxetic structure in its normal state 600 and in its collapsed state 610 when a force is applied. This example of an auxetic structure is a tube, which shrinks its diameter while the length is compressed. As will be appreciated, many other possible 3D structures can be created using the systems and techniques described herein. In addition, the 3D structures can be generated from a 2D lattice that is extruded in a 3D dimension.

Figure 7A:
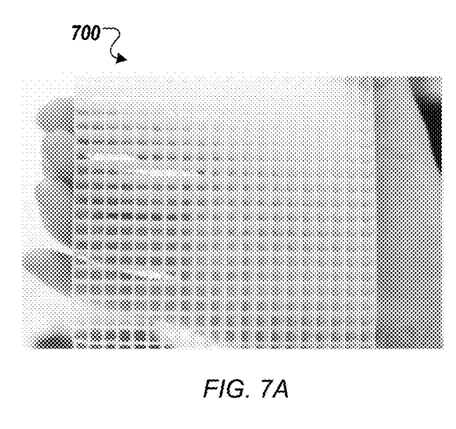
FIGS. 7A-7B show an example of an auxetic structure with embedded human or computer readable information.
Figure 7B:
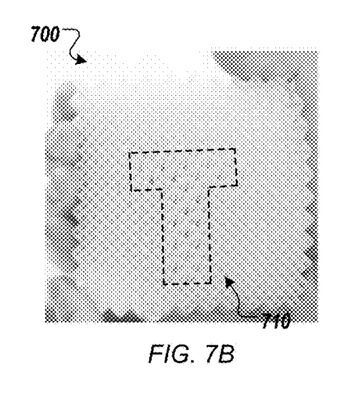

FIG. 7A shows an example of an auxetic structure 700 that has been extruded from a 2D lattice in this fashion. In addition, the auxetic structure 700 has been created with embedded human or computer readable information. In this example, when the auxetic structure 700 is collapsed under a load, as shown in FIG. 7B, the collapse occurs differently in different parts of the structure 700, based on differences in the hinges placed in the structure 700. In this case shown, an area 710 creates a different pattern as it collapses, where the shape of that different pattern forms the letter T (note that dashed lines have been added in FIG. 7B to highlight the outline of the different pattern in the collapsed structure). As will be appreciated, various types of information can be embedded in the shapes of the collapse patterns for auxetic 3D structures, as described herein, and such embedded information can be readable by humans, computers, or both. In general, two structural configurations can be combined in one material structure. Once the material is pressed, the two structural configurations deform differently to form two patterns, and one can embed human and/or computer readable information with such patterns formed from the combination of different structural configurations.

Figure 8A:
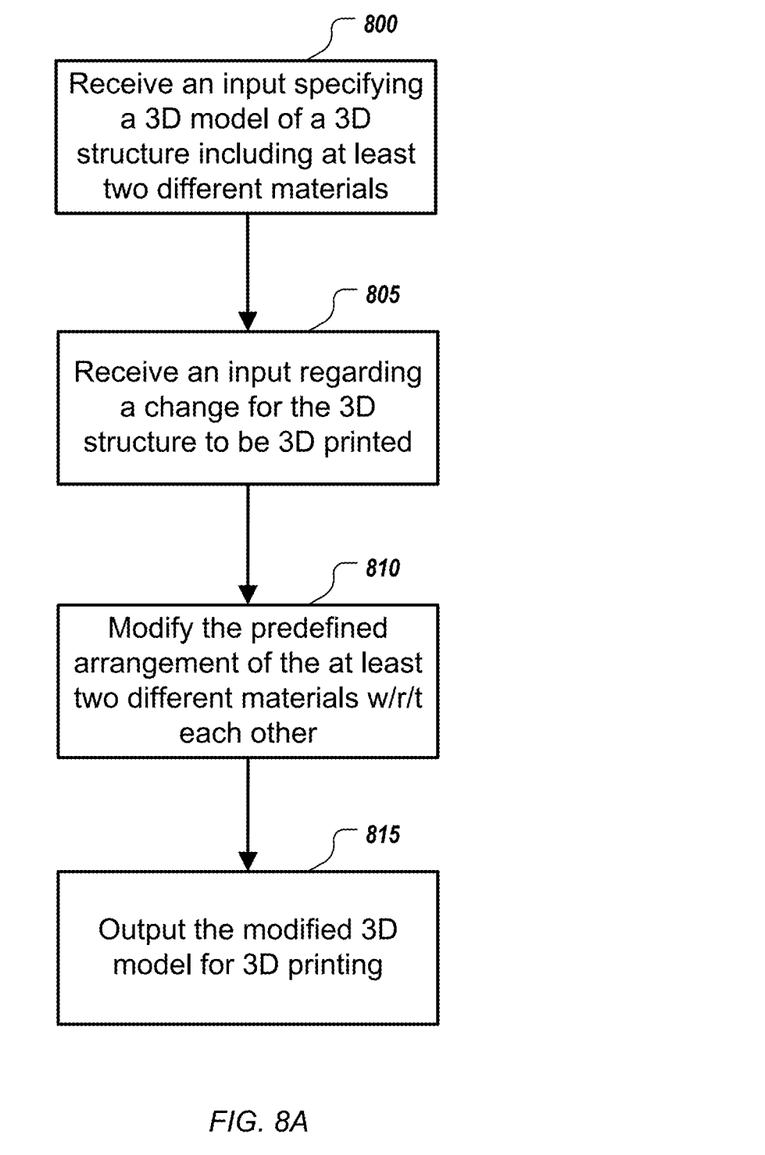
FIGS. 8A-8C show examples of processes for designing auxetic structures.

FIG. 8A shows an example of a process for designing auxetic structures. At 800, input is received specifying a 3D model of a 3D structure that includes at least two different materials. The at least two different materials can have a predefined arrangement with respect to each other so as to give the 3D structure a negative Poisson ratio. In addition, the 3D model can be one that will be generated from a cellular unit that includes the at least two different materials, or the 3D model can include predefined model elements along with an associated cellular unit. Thus, the input here can be identification of a previously defined cellular unit or a previously defined model that includes a lattice built from a cellular unit, or the input here can be the creation of a 3D model that includes a lattice built from a predefined cellular unit and/or creation of a cellular unit to build such a lattice.

At 805, input is received regarding a change for the 3D structure. In some implementations, this can involve receiving at least one target property for the 3D structure. For example, a user can specify a target value for the Poisson ratio of the 3D structure, a maximum reduce area of the 3D structure, a global stiffness for the 3D structure, and/or one or more additional target structural characteristics for the 3D structure. In some implementations, the receiving at 805 can involve receiving numerical input (e.g., from a user through UI 400 in FIG. 4A) that specifies values for one or more predefined parameters used to automatically generate a 3D model of the 3D structure. In some implementations, the input at 805 can be human or computer readable information that is to be embedded in a pattern of deformation in the 3D structure that is 3D printed from the generated 3D model.

At 810, the predefined arrangement of the at least two different materials with respect to each other is modified in response to the input regarding the change for the 3D structure. In some implementations, this can involve creating at least two different structural configurations that deform differently in response to a load. The two different structural configurations can come from two different cellular units, or the two different structural configurations can be created by modifying a base cellular unit to be in a different configuration in some parts of the 3D model, as governed by the received human or computer readable information to be embedded. Thus, human or computer readable information can be embedded in a pattern of deformation of a first or a second of at least two different structural configurations, or in a combination the first structural configuration and the second structural configuration with respect to how they deform in the 3D printed 3D structure.

In some implementations, the modification at 810 can involve reconfiguring a ratio and deposit location of at least one of the at least two different materials (e.g., changing positions and sizes of soft polymer hinges in the structure) to change a global stiffness and a maximum reduce area of the 3D structure. Other aspects of the 3D structure can be readily changed by modifying some aspect of a cellular unit that is copied to form a lattice portion of the 3D structure. In addition, in some implementations, the modification at 810 can be part of an iterative design process using simulation of structural aspects of the 3D structure and also, potentially, randomized generation of 3D models for testing (e.g., a survival of the fittest design approach modelled on evolutionary theories).

At 815, the modified 3D model is output for 3D printing. This can occur after any appropriate lattice generation and/or conversion to a format for a target 3D printer. Alternatively, the modified 3D model can be stored at 815, for later retrieval and 3D printing.

Figure 8B:
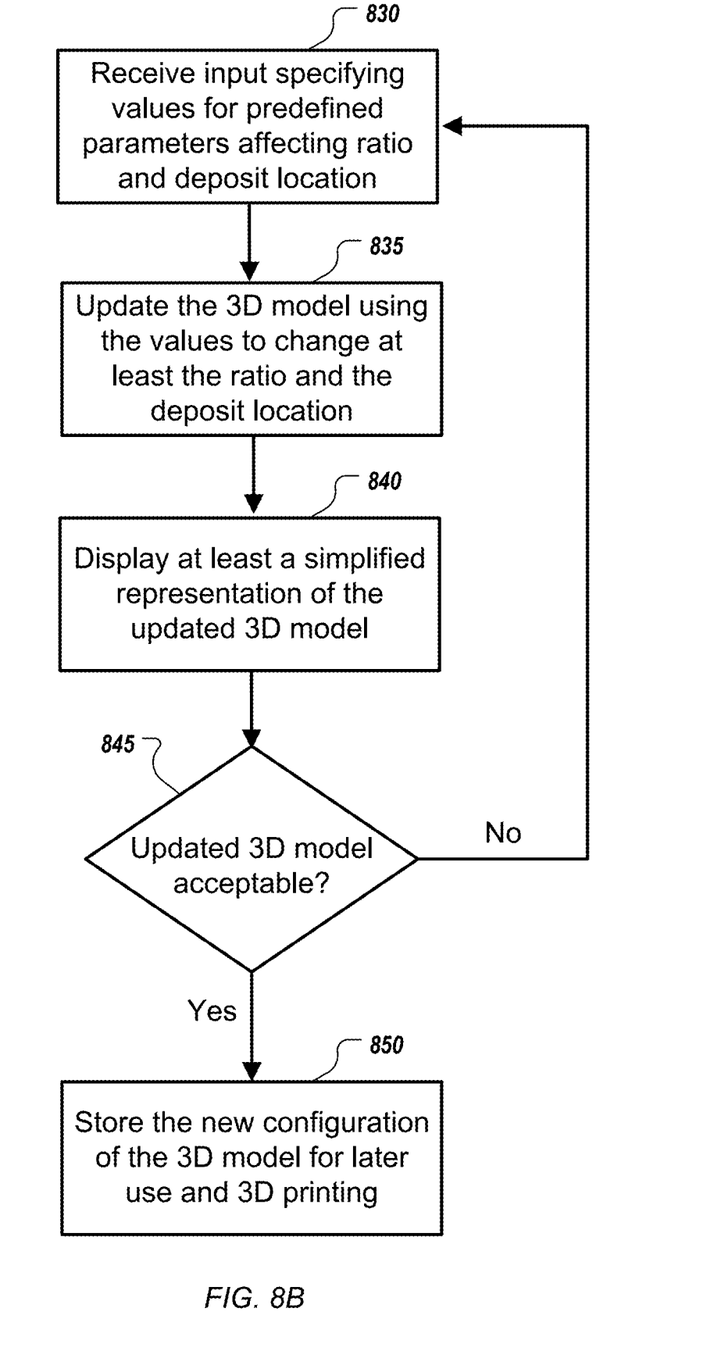

FIG. 8B shows details of an example of a process for designing auxetic structures. At 830, numerical input can be received through a user interface, where the numerical input specifies values for predefined parameters affecting both a ratio between at least two of the at least two different materials and a deposit location of at least one of the at least two different materials. Various predefined parameters can be used, and various structural aspects of the 3D model can be changed, as addressed above. For example, the predefined parameters can include a cellular unit size, a position of a first of the at least two different materials, an amount of the first of the at least two different materials, and a transition rate between the first of the at least two different materials and a second of the at least two different materials.

In any case, the 3D model can be modified based on this input in an iterative process. At 835, the 3D model can be updated using the values for the predefined parameters to change at least the ratio and the deposit location in the 3D model. This can involve applying the values to one or more cellular units to modify their configuration, copying the modified cellular unit(s) to create a larger structure (potentially using mirroring), and then expanding or inserting the larger structure into the 3D model. Thus, the 3D model can be used to create a 3D structure composed of a repeated pattern of struts forming elements of a lattice, and in some implementations, the updating at 835 can include adjusting a gradation of change in material distribution between the first material and the second material in the cellular unit, and thus in one or more struts of the 3D structure, based on the input received at 830.

At 840, at least a simplified representation of the 3D model can be displayed to the user to show the change in at least the ratio and the deposit location. This can involve displaying a pattern of cellular units constructed in accordance with the updated model, such as shown in FIG. 4B. Alternatively or additionally, this can involve showing a larger 3D model with the lattice formed therein from the pattern of cellular units constructed in accordance with the updated model. In any case, the user can be provided visual feedback on how the numerical inputs will change the 3D structure, and the user can decide at 845 whether the updated 3D model is acceptable (e.g., based on the appearance on the screen and/or based on simulated testing of structural aspects of the 3D structure to be 3D printed from the 3D model). While it is not acceptable, more input can be received and more modifications can be made.

Once the updated 3D model is acceptable, the new configuration of the 3D model can be stored at 850 for later use and 3D printing. Note that this can involve storing a 3D model with both non-lattice components and lattice components, fully created based on the modified cellular unit(s), integrated together in one 3D model. Alternatively, the modified cellular unit(s) can be stored separately and also be associated with a 3D model in which the lattice generated from the modified cellular unit(s) can be created on-the-fly, as needed.

Figure 8C:
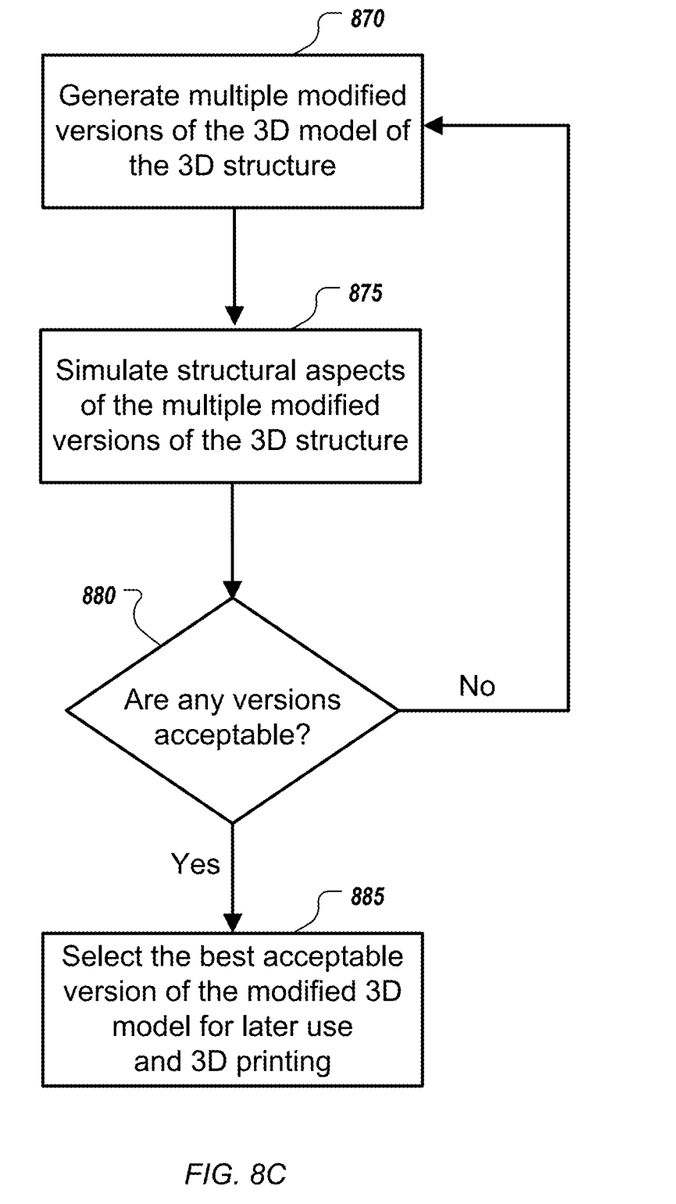

FIG. 8C shows details of another example of processes for designing auxetic structures. In this example, at least one target property for the 3D structure has been received previously. For example, the target property can include target values for shear resistance, indentation resistance, fracture toughness, sound and vibration absorption, etc.

At 870, multiple modified versions of the 3D model of the 3D structure can be generated. These different versions can be generated using a genetic-type algorithm, where random variation is introduced into the 3D model. For example, a pseudo random function can be used to modify one or more existing values for the parameters of a cellular unit that is then used to build different 3D lattice models for testing.

At 875, structural aspects of the multiple modified versions of the 3D model of the 3D structure can be simulated. For example, the program that generates the 3D lattice models can also do the testing of these 3D lattices by simulating the application of forces to each respective 3D model to assess each 3D model's capacity with regard to meeting the one or more target properties set for the 3D structure. This simulation testing can employ various known techniques, including Finite Element Analysis (FEA) algorithms.

At 880, a check can be made to see if the simulation testing of the multiple modified versions of the 3D model has revealed any that are acceptable in terms of satisfying the one or more target properties set for the 3D structure. If not, the process can repeat at 870. Note that the best of the unacceptable versions (or the top N best) can be used as the starting point for the next round of modification generation. Thus, the design can "evolve" over time to meet the target using random modifications along the way. Once any of the modified versions of the 3D model are found acceptable, the best acceptable version of the 3D model can be selected at 885 (e.g., the 3D model of the 3D structure having a best set of simulated structural aspects for the at least one target property) for later use and 3D printing.

Figure 9:
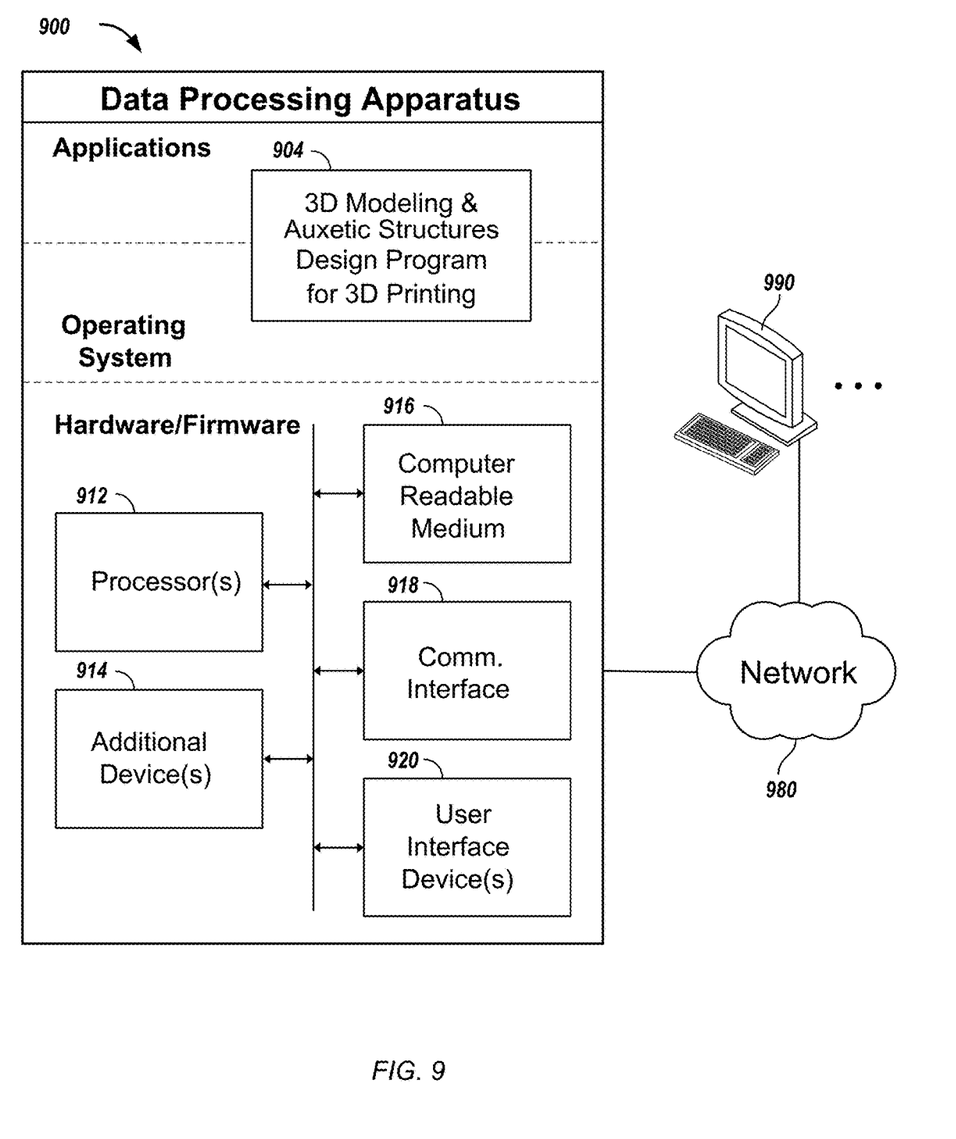
FIG. 9 is a schematic diagram of a data processing system.

FIG. 9 is a schematic diagram of a data processing system including a data processing apparatus 900, which can be programmed as a client or as a server. The data processing apparatus 900 is connected with one or more computers 990 through a network 980. While only one computer is shown in FIG. 9 as the data processing apparatus 900, multiple computers can be used. The data processing apparatus 900 includes various software modules, which can be distributed between an applications layer and an operating system. These can include executable and/or interpretable software programs or libraries, including a 3D modeling & auxetic structures design program 904 for 3D printing, such as described above. The number of software modules used can vary from one implementation to another. Moreover, the software modules can be distributed on one or more data processing apparatus connected by one or more computer networks or other suitable communication networks. In general, the 3D modeling & auxetic structures design program 904 can be viewed as a set of tools that facilitate creation of new auxetic structures for 3D printing.

The data processing apparatus 900 also includes hardware or firmware devices including one or more processors 912, one or more additional devices 914, a computer readable medium 916, a communication interface 918, and one or more user interface devices 920. Each processor 912 is capable of processing instructions for execution within the data processing apparatus 900. In some implementations, the processor 912 is a single or multi-threaded processor. Each processor 912 is capable of processing instructions stored on the computer readable medium 916 or on a storage device such as one of the additional devices 914. The data processing apparatus 900 uses its communication interface 918 to communicate with one or more computers 990, for example, over the network 980. Examples of user interface devices 920 include a display, a camera, a speaker, a microphone, a tactile feedback device, a keyboard, and a mouse. The data processing apparatus 900 can store instructions that implement operations associated with the modules described above, for example, on the computer readable medium 916 or one or more additional devices 914, for example, one or more of a floppy disk device, a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A system comprising:
   one or more computer storage media having instructions stored thereon; and
   one or more data processing apparatus configured to execute the instructions to perform operations comprising (i) receiving an input specifying a three dimensional (3D) model of a 3D structure that includes at least two different materials having a predefined arrangement with respect to each other to give the 3D structure a negative Poisson ratio, (ii) receiving an input regarding a change for the 3D structure, and (iii) modifying the predefined arrangement of the at least two different materials with respect to each other in response to the input regarding the change;
   wherein the 3D structure comprises a repeated pattern of struts forming elements of a lattice, a strut in the repeated pattern comprises (i) a first material forming at least a first part of the strut and (ii) a second different material forming at least a second part of the strut, and the one or more data processing apparatus are configured to execute the instructions to perform operations comprising adjusting, in the 3D model of the lattice, a gradation of change in material distribution between the first material and the second material in the strut based on input; and
   wherein the 3D structure comprises at least two different structural configurations that deform differently in response to a load, and the one or more data processing apparatus are configured to execute the instructions to perform operations comprising embedding human or computer readable information in a pattern of deformation of a first of the at least two different structural configurations, a second of the at least two different structural configurations, or both the first structural configuration and the second structural configuration in the 3D structure.

2. The system of claim 1, wherein modifying the predefined arrangement comprises reconfiguring a ratio and deposit location of at least one of the at least two different materials to change a global stiffness and a maximum reduce area of the 3D structure.

3. The system of claim 2, wherein the at least two different materials comprise a soft polymer and a hard polymer.

4. The system of claim 2, wherein the 3D structure includes at least two cellular unit configurations.

5. The system of claim 1, wherein receiving the input regarding the change for the 3D structure comprises receiving at least one target property for the 3D structure, and modifying the predefined arrangement comprises:
   generating multiple modified versions of the 3D model of the 3D structure;
   simulating structural aspects of the multiple modified versions of the 3D model of the 3D structure; and
   selecting one of the multiple modified versions of the 3D model of the 3D structure as having a best set of the simulated structural aspects for the at least one target property for the 3D structure.

6. The system of claim 1, wherein receiving the input regarding the change for the 3D structure comprises receiving numerical input through a user interface that specifies values for predefined parameters affecting both a ratio between at least two of the at least two different materials and a deposit location of at least one of the at least two different materials, and wherein modifying the predefined arrangement comprises:

updating the 3D model using the values for the predefined parameters to change at least the ratio and the deposit location in the 3D model; and displaying at least a simplified representation of the 3D model to show the change in at least the ratio and the deposit location.

7. The system of claim 6, wherein the user interface comprises multiple user interface elements corresponding to the predefined parameters comprising a cellular unit size, a position of a first of the at least two different materials, an amount of the first of the at least two different materials, and a transition rate between the first of the at least two different materials and a second of the at least two different materials.

8. A three dimensional (3D) printed auxetic structure comprising:

a repeated pattern of struts forming elements of a lattice;

wherein each of the struts in the repeated pattern comprises (i) a first material forming at least a first part of the strut, and (ii) a second material, which is different than the first material, forming at least a second part of the strut; and wherein a ratio of the first material to the second material and at least one deposit location of the first material in the 3D printed auxetic structure have been adjusted to make the 3D printed auxetic structure satisfy a global stiffness and a maximum reduce area of the 3D printed auxetic structure;

wherein the repeated pattern of struts is a first repeated pattern of struts, the structure comprising a second repeated pattern of struts forming additional elements of the lattice, wherein the first repeated pattern of struts and the second repeated pattern of struts have different cellular unit configurations; and wherein the first repeated pattern of struts deforms differently than the second repeated pattern of struts when the 3D printed auxetic structure is deformed by a load, and wherein human or computer readable information is embedded in a pattern of deformation of the first repeated pattern of struts, the second repeated pattern of struts, or both the first repeated pattern and the second repeated pattern in the 3D printed auxetic structure.

9. The 3D printed auxetic structure of claim 8, wherein the first material is a soft polymer, and the second material is a hard polymer.

10. A method comprising:

receiving an input specifying a three dimensional (3D) model of a 3D structure that includes at least two different materials having a predefined arrangement with respect to each other to give the 3D structure a negative Poisson ratio;

receiving an input regarding a change for the 3D structure; and modifying the predefined arrangement of the at least two different materials with respect to each other in response to the input regarding the change;

wherein the 3D structure comprises a repeated pattern of struts forming elements of a lattice, a strut in the repeated pattern comprises (i) a first material forming at least a first part of the strut and (ii) a second different material forming at least a second part of the strut, and the method comprises adjusting in the 3D model of the lattice a gradation of change in material distribution between the first material and the second material in the strut based on input; and wherein the 3D structure comprises at least two different structural configurations that deform differently in response to a load, and the method comprises embedding human or computer readable information in a pattern of deformation of a first of the at least two different structural configurations, a second of the at least two different structural configurations, or both the first structural configuration and the second structural configuration in the 3D structure.

11. The method of claim 10, wherein modifying the predefined arrangement comprises reconfiguring a ratio and deposit location of at least one of the at least two different materials to change a global stiffness and a maximum reduce area of the 3D structure.

12. The method of claim 10, wherein receiving the input regarding the change for the 3D structure comprises receiving at least one target property for the 3D structure, and modifying the predefined arrangement comprises:

generating multiple modified versions of the 3D model of the 3D structure;

simulating structural aspects of the multiple modified versions of the 3D model of the 3D structure; and selecting one of the multiple modified versions of the 3D model of the 3D structure as having a best set of the simulated structural aspects for the at least one target property for the 3D structure.

13. The method of claim 10, wherein receiving the input regarding the change for the 3D structure comprises receiving numerical input through a user interface that specifies values for predefined parameters affecting both a ratio between at least two of the at least two different materials and a deposit location of at least one of the at least two different materials, and wherein modifying the predefined arrangement comprises:

updating the 3D model using the values for the predefined parameters to change at least the ratio and the deposit location in the 3D model; and displaying at least a simplified representation of the 3D model to show the change in at least the ratio and the deposit location.

14. The method of claim 13, wherein the user interface comprises multiple user interface elements corresponding to the predefined parameters comprising a cellular unit size, a position of a first of the at least two different materials, an amount of the first of the at least two different materials, and a transition rate between the first of the at least two different materials and a second of the at least two different materials.

* * * * *